June 16, 1959   W. KOHLHAGEN   2,891,182
COMMUTATOR-TYPE ELECTRIC MOTOR OF TEMPERATURE-CONTROLLED
OUTPUT TORQUE
Filed Feb. 7, 1958   3 Sheets-Sheet 3
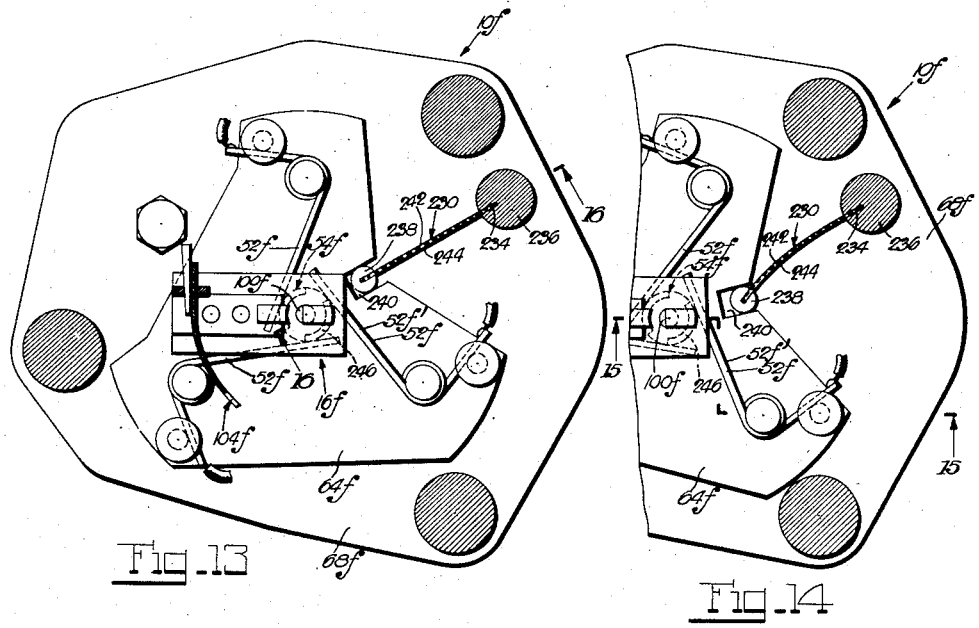
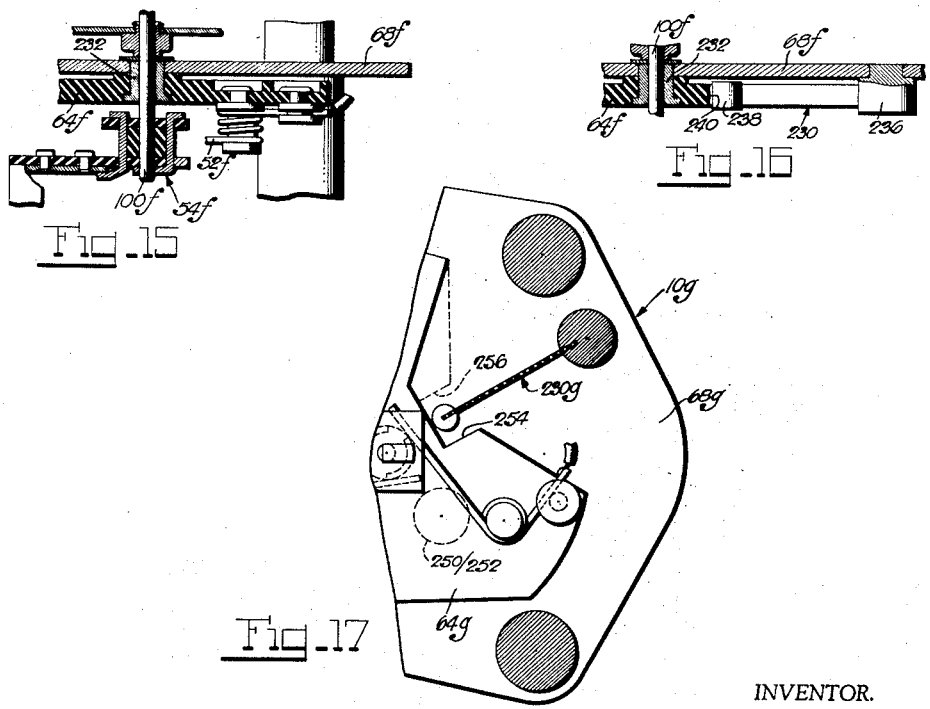
INVENTOR.
Walter Kohlhagen
BY
Attorney.

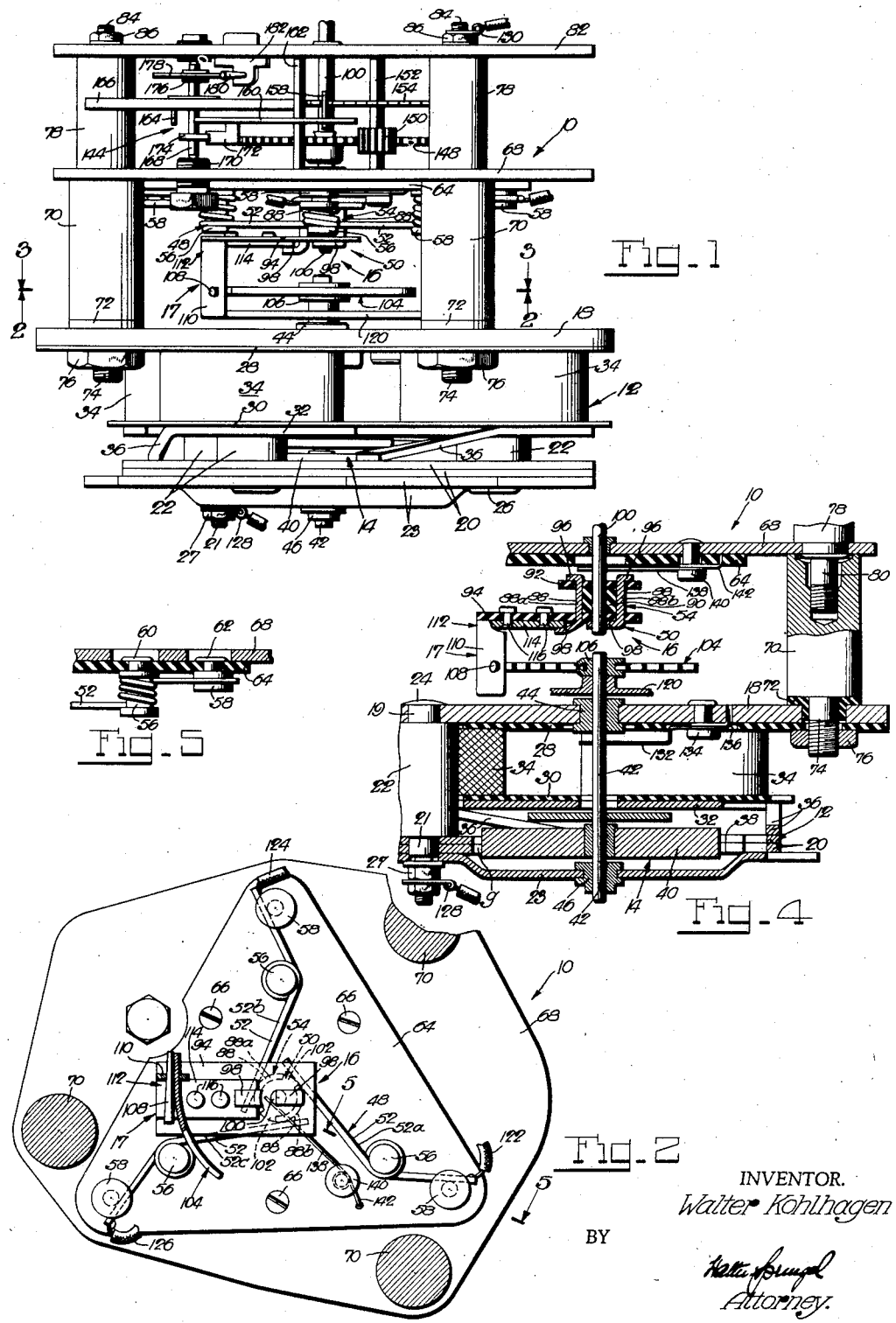

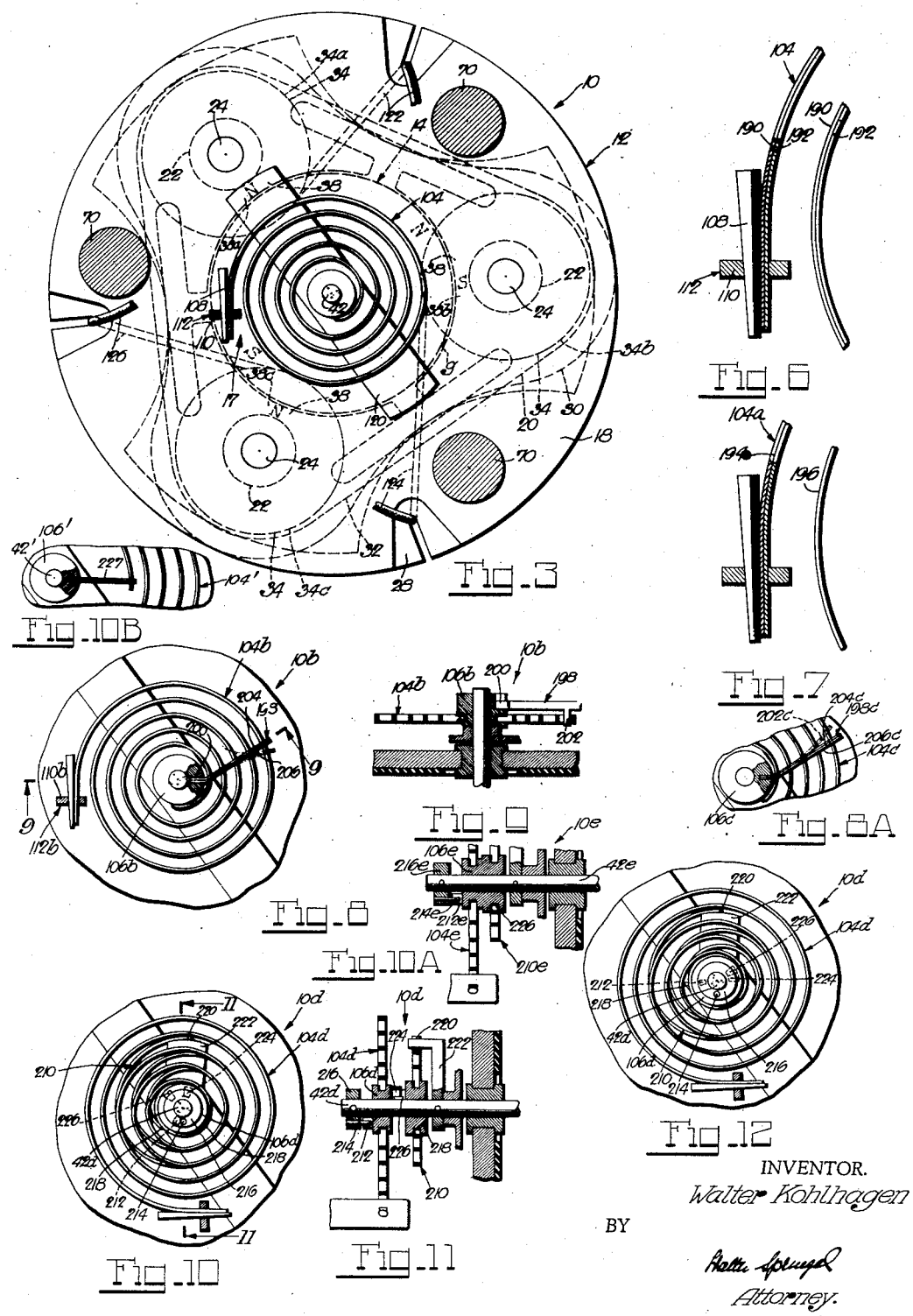

United States Patent Office 2,891,182
Patented June 16, 1959

2,891,182

COMMUTATOR-TYPE ELECTRIC MOTOR OF TEMPERATURE-CONTROLLED OUTPUT TORQUE

Walter Kohlhagen, Elgin, Ill., assignor to The E. Ingraham Company, Bristol, Conn., a corporation of Connecticut Application February 7, 1958, Serial No. 713,947

18 Claims. (Cl. 310—40)

This invention relates to commutator-type electric motors of regulated output torque.

The motor to which the present invention generally pertains is of the type disclosed in the patent to Putnocky, No. 2,624,017, dated December 30, 1952. This motor features a rotor unit comprising a rotor and the rotary unit of a commutation device, in this case the commutator, of which the latter and the rotor are separated from each other and drivingly connected by a preloaded coupling spring which compels the commutator to turn in the same direction as the rotor. The commutator in this prior motor is under the control of an escapement so that the magnetic field in the field structure, and hence also the rotor, will advance rotatively in intermittent steps between rest periods which are also under the control of the escapement. Either the rotor or the commutator may be used as the output element of the motor. If the rotor is used as the output element, the full magnetic motor torque is available for utility purposes and the rotor will step after equal time intervals under the control of the escapement. If the commutator is used as the output element, the output torque is furnished by the coupling spring and, hence, may be considerably smaller in magnitude than the magnetic torque in the motor, and the commutator will also turn at a rate controlled by the escapement. There is also provided in this prior motor a lost motion connection between the rotor and commutator which permits relative rotation between the latter through a limited range within part of which the rotor will step in phase with the intermittently turning magnetic field in the field structure and thereby periodically reload the coupling spring beyond its preload stage, and to one end of which the coupling spring will, on interruption of the current, back the rotor so as to prevent unloading of the coupling spring below its preload stage and to hold the rotor in position to continue in the same phase relation with the magnetic field on reapplication of the current.

Motors of this type may be used for many practical applications, among which are numerous applications for timing purposes. If this type of motor is used for timing purposes, it is, of course, imperative for the accuracy of its timing function that the torque delivered to the rotary unit of the commutation device does not vary so much as to affect the constant rate of the escapement. While it is inherent in this type of motor that the torque imparted to the escapement by the rotary unit of the commutation device varies constantly back and forth within a range determined by the periodic reloading of the coupling spring on successive commutation changes, the commutation angle may be selected and the escapement designed so that the rate of the latter remains constant despite these constant torque variations. However, there are factors which may and will affect the rate of the escapement, in which case precautionary measures will have to be taken to avoid a change in the rate of the escapement. One of these factors which may affect the rate of the escapement is variation of the temperature of the surrounding atmosphere and ensuing variation of the running friction of the moving parts of the motor and of the other parts or devices driven thereby. While for many practical timing applications of a motor of this type prevailing variations in the temperature of the surrounding atmosphere may be insufficient to affect the rate of the escapement, and while good and lasting lubrication of the motor and of the parts or devices driven thereby will alleviate, or may even obviate, any adverse effect which variations in temperature of the surrounding atmosphere may have on the rate of the escapement, there are many other applications in which the motor may and will for a long time, or even for a short time, be subjected to such wide variations in the temperature of the surrounding atmosphere that the rate of the escapement will be affected thereby despite ordinary lubricating provisions, and may be affected thereby despite even elaborate lubricating provisions. An exemplary motor application in point in this respect is for an automobile clock which is expected to run accurately not only in widely varying surrounding temperatures, but for the life of the automobile as well.

It is the primary aim and object of the present invention to provide a motor of this type in which the torque output of the rotary commutation unit will automatically be regulated so that the rate of the escapement will not be affected on even the widest temperature variations of the surrounding atmosphere and such ensuing variations in the running friction of the motor and of the parts or devices driven thereby as will occur despite, or even in the absence of, lubrication of the motor and driven parts.

It is another object of the present invention to provide a motor of this type in which the torque output of the rotary commutation unit will be regulated by a bimetal device the differential expansion and contraction of the dissimilar metal elements of which in the atmosphere immediately surrounding the motor will directly or indirectly influence the coupling spring to the end of increasing and decreasing its output force at lower and higher atmospheric temperatures, respectively, to such an extent that the rate of the escapement will remain constant over most any desired, and even the widest, temperature range of the surrounding atmosphere.

It is a further object of the present invention to provide a motor of this type in which differential expansion and contraction of the dissimilar metal elements of the aforementioned bimetal device on variation of the temperature of the surrounding atmosphere may directly or indirectly influence the coupling spring either throughout, or only within any desired part or parts of, the contemplated overall temperature range within which the rate of the escapement is to remain constant, thereby to afford a choice between alternative expediences to attain such compensation of the output force of the coupling spring as will most nearly approximate that required for maintaining the impulse force of the escapement constant at any temperature of the surrounding atmosphere within the contemplated overall range.

Another object of the present invention is to provide a motor of this type in which the aforementioned bimetal device may directly influence the coupling spring by being so operatively connected with the latter that differential expansion and contraction of the dissimilar metal elements of the former will change the preload of the coupling spring, thereby achieving not only compensation of the output torque of the coupling spring entirely mechanically, but also impulsing of the escapement with a force which cyclically varies within a substantially constant range during operation of the motor and, additionally, is also more or less constant at each restart of the motor, regardless of the temperature of the surrounding atmosphere.

A further object of the present invention is to provide a motor of this type in which the aforementioned bimetal device may, alternatively, influence the coupling spring indirectly, by arranging the normally fixed unit of the commutation device so that the same is shiftable about the rotary unit thereof, and operatively connecting the bimetal device with the former unit for shifting the same to the end of advancing and retarding the commutation of the motor at lower and higher temperatures, respectively, of the surrounding atmosphere, thereby achieving, through commutation changes, compensation of the output torque of the coupling spring to the end that the escapement will be impulsed with a force which during operation of the motor at most any atmospheric temperature and changes thereof varies cyclically within a substantially constant range, but varies at restarts of the motor at different temperatures of the surrounding atmosphere, though not sufficiently to be of any consequence for most practical applications.

Other objects and advantages will appear to those skilled in the art from the following, considered in conjunction with the accompanying drawings.

In the accompanying drawings, in which certain modes of carrying out the present invention are shown for illustrative purposes:

Fig. 1 is an elevational view of a motor embodying the present invention;

Figs. 2 and 3 are cross sections through the motor substantially as taken on the lines 2—2 and 3—3, respectively, of Fig. 1;

Fig. 4 is a fragmentary longitudinal section through the motor;

Fig. 5 is a fragmentary section taken substantially on the line 5—5 of Fig. 2;

Fig. 6 is an enlarged fragmentary view, partly in section, of a prominent operating device of the motor;

Fig. 7 is a view similar to Fig. 6 and showing the same operating device of the motor in modified form;

Fig. 8 is a fragmentary section through a motor embodying the present invention in a modified manner;

Fig. 8A is a fragmentary section through a motor embodying the present invention in a further modified manner;

Fig. 9 is a fragmentary section taken substantially on the line 9—9 of Fig. 8;

Fig. 10 is a fragmentary section through a motor embodying the present invention in another modified manner;

Fig. 11 is a fragmentary section taken substantially on the line 11—11 of Fig. 10;

Fig. 12 is another fragmentary section through the modified motor of Fig. 10, but showing the same performing under different temperature conditions;

Fig. 10A is a fragmentary section through a motor embodying the present invention in a further modified manner;

Fig. 10B is a fragmentary section through a motor embodying the present invention in another modified manner;

Fig. 13 is a fragmentary section through a motor embodying the present invention in a further modified manner;

Fig. 14 is another fragmentary section through the modified motor of Fig. 13, but showing the same performing under different temperature conditions;

Figs. 15 and 16 are fragmentary sections taken on the lines 15—15 and 16—16 of Figs. 14 and 13, respectively; and Fig. 17 is a fragmentary section through a motor embodying the present invention in another modified manner.

Referring to the drawings, and more particularly to Figs. 1 to 5 thereof, the reference numeral 10 designates a motor which has as its major components a field structure 12, a rotor structure 14, a commutation device 16, and a driving connection 17 between the rotor structure and the commutation device. The field structure 12 comprises a field plate 18, one or more pole plates 20, and equiangularly spaced ferromagnetic cores 22, presently three, which are interposed between the plates 18 and 20 and hold the latter in spaced parallel relation. To this end, shanks 19 on adjacent ends of the cores 22 are conveniently riveted to the field plate 18 as at 24 (Figs. 3 and 4), while their opposite end shanks 21 extend through the pole plates 20 and a superposed non-magnetic end plate 23 and are secured to the latter. Thus, the end shanks 21 of two of the cores 22 are conveniently riveted over the end plate 23 as at 26 (Fig. 1), while the end shank 21 of the remaining core 22 is, for a reason hereinafter described, preferably threaded and receives a nut or nuts 27 for its attachment to the end plate 23. Surrounding the cores 22 and interposed between the field plate 18 and a retainer plate 32, preferably through intermediation of insulation pieces 28 and 30, respectively, are field coils 34. The plate 32 firmly holds the field coils 34 against the field plate 18, plate 32 having to this end punched-out prongs 36 which are bent out of the plane of the latter and rest against the nearest pole plate 20 (Figs. 1 and 4). The plates 20 are provided with punched-out field poles 38 which are associated with the field coils 34 (Fig. 3).

The rotor structure 14 comprises a rotor 40 on a shaft 42 which, as shown in Fig. 4, is journalled in suitable bearings 44 and 46 in the field plate 18 and end plate 23, respectively, so as to maintain an air gap $g$ of uniform width between the periphery of the rotor 40 and the field poles 38 (Fig. 3). The rotor 40 is, in this instance, a permanent-magnet disc having two opposite N and S poles (Fig. 3).

The commutation device 16 comprises a fixed unit 48 and a rotary unit 50, of which the fixed unit is, in the present example, a set of brushes 52, while the rotary unit is a commutator 54. The brushes 52, of which there are presently three due to their direct connection with the field coils 34, respectively, as described hereinafter, are in this instance in the form of simple conductive wire-type torsion springs which are anchored on posts 56 (Figs. 1, 2 and 5) and urged into engagement with the commutator 54 by being backed with their outer ends against further posts 58. The posts 56 and 58 are suitably mounted, and preferably riveted as at 60 and 62, to an insulation plate 64 (Figs. 2 and 5) which, in turn, is screwed at 66 to a plate 68 that is electrically conductive for reasons hereinafter explained, wherefore the brushes 52 are insulatingly carried by the conductive plate 68 through intermediation of the insulation plate 64. The conductive plate 68 is, in turn, carried by the field plate 18 in electrically insulated and spaced relation therewith through intermediation of pillars 70. To this end, the lower ends of the pillars 70 rest on flanged insulating bushings 72 in the field plate 18 (Figs. 1 and 4), and their reduced shanks 74 thereat project through these bushings and receive nuts 76 which bear against the insulation piece 28 on the field plate 18. The plate 68 rests on top of the pillars 70 and is held thereon by additional pillars 78 the reduced bottom shanks 80 of which are threadedly received in the respective pillars 70 (Fig. 4). The pillars 78 serve to support another plate 82 on the plate 68 in spaced relation therewith (Fig. 1). To this end, the reduced top shanks 84 on the pillars 78 extend through the plate 82 and receive nuts 86.

The commutator 54 comprises conductive segment element 88, presently two in view of the exemplary provision of three brushes 52. The commutator 54 further comprises an insulating core 90 and opposite insulating end pieces 92 and 94 through which extend end prongs 96 and 98, respectively, of the segment elements 88 that are bent over in the fashion shown in Fig. 4 for the assembly of the commutator parts 88, 90, 92 and 94 into a self-contained unit which is firmly mounted on a shaft 100, journalled in the plates 68 and 82. The segment elements 88 are equiangularly spaced from each other, and are of such peripheral extent that at least two of the brushes 52 will in any angular position of the commutator engage the segment elements 88a and 88b, respectively. The commutator segments 88 are received in longitudinal recesses in the insulating core 90 so that segmental portions 102 of the latter extend between the conductive segment elements 88 and are peripherally flush therewith (Fig. 2).

The driving connection 17 between the rotor structure 14 and the commutation device 16 comprises a coupling spring 104 and anchor connections of its ends with the rotor shaft 42 and the rotary unit of the commutation device, presently the commutator 54. To this end, the coupling spring 104, which is presently of spiral coiled type, is with its inner end secured, presently in the conventional manner (Fig. 4) of a hairspring of a movement, to a collet 106 on the rotor shaft 42, while the outer end of the coupling spring is anchored by a wedge 108 in a leg 110 of an L-shaped bracket 112 which with its other leg 114 is secured, by rivets 116, for instance, to the insulating arm or end piece 94 of the commutator 54.

Since the commutator-carrying shaft 100 is presently the output or load shaft of the motor and is to receive torque from the coupling spring 104, and since the required torque output in this case greatly exceeds the torque imparted to the shaft 100 solely by virtue of the stepping of the rotor structure 14 in phase with the rotating magnetic field in the field structure 12, it follows that the spring 104 must be prewound to an extent near which it will impart the required torque to the shaft 100 when the motor runs, and must remain so prewound when the motor stops as the spring would otherwise unwind and the motor become inoperative. To this end, there is provided between the rotor structure 14 and the rotary unit of the commutation device 16 a lost-motion connection which presently is in the form of a phase arm 120 on the rotor shaft 42 and cooperates with the leg 110 of the bracket 112 on the arm 94 of the commutator 54 in a manner more fully explained hereinafter.

The field coils 34 may be connected in Y or Δ fashion, and in this case may be considered to be connected in Y fashion, with their one ends connected with each other (not shown). The other ends of the field coils 34a, 34b and 34c are connected with the brushes 52a, 52b and 52c, respectively, through leads 122, 124 and 126, respectively (Figs. 2 and 3). Since the rotor 40 is, in the present instance, of permanent-magnet type, the current required for operating the motor is D.C. The current path through the motor is in the present example the same as that featured in my copending application Serial No. 656,280, filed May 1, 1957. Thus, for its connection with a current source, the motor is provided with terminals 128 and 130 either one of which may be the positive terminal and the other one the negative terminal. Assuming now that the terminal 128 is the positive terminal (Fig. 4), the current flow through the motor in the exemplary relative angular position of the fixed and rotary units of the commutation device 16 (Fig. 2) is via the terminal 128, the associated core 22, stator plate 18, bearing 44, rotor shaft 42, collet 106, coupling spring 104, L bracket 112 and commutator segment 88a which by its bent-over lug 98 is electrically connected with the bracket 112 (Fig. 4), thence brush 52b (Fig. 2), conductor 124, the connected field coils 34b and 34c (Fig. 3), conductor 126, brush 52c (Fig. 2), commutator segment 88b, output shaft 100 (Fig. 4) by virtue of its pressfitted reception of the bent-over lug 98 of the commutator segment 88b, plate 68 and pillar 78 to the terminal 130 (Fig. 1). To assure a permanent and reliable electrical connection between the rotor shaft 42 and the fixed field plate 18, there is additionally provided a wiping contact in the form of a wire-type torsion spring 132 (Fig. 4) which is in contact with the rotor shaft 42, and is anchored on a post 134 in electrically conductive relation with the field plate 18 and kept loaded by having its end 136 locked to the latter. To assure a like permanent and reliable electrical connection between the rotary output shaft 100 and the fixed plate 68, there is additionally provided a wiping contact in the form of a wire-type torsion spring 138 (Figs. 2 and 4) which is in contact with the output shaft 100, and is anchored on a post 140 in electrically conductive relation with the plate 68 and kept loaded by having its end 142 locked to the insulation plate 64.

When the motor is running, the coupling spring 104 will remain wound beyond its prewind extent and will, between rewinds by the stepping rotor structure 14, partially unwind at a rate depending on the load on or permissible escape rate of the shaft 100. In the present example, the running rate of the output shaft 100 is under the control of an escapement 144 (Fig. 1), and the output shaft may, as a further example, serve as the driver of a movement in the manner disclosed in my aforementioned copending application Serial No. 656,280. To this end, the output shaft 100 carries a gear 148 which is in permanent mesh with a pinion 150 on a staff 152 which is suitably journalled in the plates 68 and 82 and carries an escape wheel 154. Cooperating with the teeth of the escape wheel 154 in conventional manner are the pallet pins 158 on one end of an escape lever 160 on a staff 162 which is suitably journalled in the plates 68 and 82. Cooperating with the other end of the escape lever 160 in conventional manner are impulse pins 164 on a balance wheel 166 on a staff 168 which is journalled in the plate 82 and in a suitable bearing 170 in the plate 68. The escape lever 160 is also provided with a guard 172 which cooperates in conventional manner with a roller 174 on the staff 168. Secured to a collet 176 on the staff 168 is the inner end of a hairspring 178, the outer end of which is secured by a wedge pin 180 to an anchor piece 182 on the plate 82. The escapement 144 just described thus permits the output shaft 100 to turn or escape at a uniform time rate.

Let it now be assumed that the motor is running in the correct direction for the drive of the aforementioned exemplary movement by the output shaft 100, i.e. counterclockwise for the commutator 54 in Fig. 2 and clockwise for the rotor 40 in Fig. 3 due to the different directions in which the sections of these figs. are taken, and let it be further assumed that the commutator 54 is in the momentary angular position shown in Fig. 2 in which the commutator segment 88b is just short of engagement with the brush 52a and is still in engagement with the brush 52c. Under these circumstances, current will pass from the previously assumed "hot" commutator segment 88a (Fig. 2) through the brush 52b, the conductor 124, the field coil 34b (Fig. 3), thence the connected field coil 34c, conductor 126, brush 52c (Fig. 2) and the other commutator segment 88b with its previously described ground connection, with the result that the field poles 38b and 38c will be of opposite polarity, in this instance S and N, respectively, as indicated in Fig. 3. Hence, the permanent-magnet rotor 40 will assume the position of minimum reluctance shown in Fig. 3 and will remain in this position for the short interval before the segment 88b of the commutator 54 on the escapement-controlled output shaft 100 comes into contact with the brush 52a, the coupling spring 104 meanwhile unwinding at its outer end clockwise as viewed in Fig. 3 and turning the commutator 54 on the output shaft 100 counterclockwise as viewed in Fig. 2 at the rate permitted by the escapement 144. The coupling spring 104 thus unwinds to the lower limit of its rewind range when on the counterclockwise drive of the commutator 54 (Fig. 2) the segment 88b thereof moves into contact with the brush 52a, the segment 88b moving shortly thereafter out of contact with the brush 52c. As soon as the commutator segment 88b moves into contact with the brush 52a, the field pole 38a (Fig. 3) becomes polarized, N in this instance, while the other field poles remain polarized as indicated, though the field pole 38c will remain thus polarized for only a brief interval thereafter, with the result that the rotor 40 swings clockwise as viewed in Fig. 3 and begins to rewind the spring 104, not stopping until after the commutator segment 88b has moved out of contact with the brush 52c and the rotor has moved into its new position of minimum reluctance in the magnetic field in the field structure 12 which in the present example is 60 degrees clockwise from its indicated position of minimum reluctance in Fig. 3. On reaching its new position of minimum reluctance, the rotor 40 has rewound the coupling spring 104 to the upper limit of its rewind range, and the same will again unwind to the lower limit of its rewind range and drive the output shaft 100 under the control of the escapement by the time the next commutation change in the field coils occurs and renewed rewinding of the spring takes place, as will be readily understood. The rotor 40 thus advances in intermittent steps of 60 degrees in this example and periodically rewinds the spring 104 while the latter keeps up its continuous drive of the output shaft at a torque which, while fluctuating due to the periodic rewind of the spring, is nevertheless sufficiently constant for many practical applications, including the drive of the aforementioned exemplary movement.

On stopping the motor, by intentionally interrupting the current, for example, the rotor structure 14 will by the coupling spring 104 be urged in a direction opposite to its normal drive direction until the phase arm 120 backs against the arm 110 of the bracket 112, whereupon the commutator 54 will also stop. When this occurs the wind of the coupling spring 104 is reduced to its prewind extent. Of course, it will be appreciated that the spring-urged back-up of the phase arm 120 against the arm 110 of the bracket 112 on stopping the motor must necessarily be limited so that the rotor 40 will step into phase relation with the magnetic field in the field structure 12 when the motor is restarted on reapplication of the current thereto. Thus, assuming that the motor is stopped when the commutator 54 is in the momentary position shown in Fig. 2 in which the magnetic field lies across the field poles 38b and 38c in Fig. 3 as described, it follows that the ensuing quick spring-urged back-up of the rotor 40 with its phase arm 120 against the arm 110 of the bracket 112 will leave the rotor 40 in an angular position from which it will, on restarting the motor, immediately step into phase with the magnetic field across the same field poles 38b and 38c and continue in proper phase relation with the rotating magnetic field.

The present motor and parts driven thereby may be lubricated in any suitable manner (not shown), and mere lubrication may be adequate for accurate timing performance of the motor for many practical applications. However, there are many other important applications of the present motor in which the same is for a long time, or even for a short time, subjected to such wide variations in the temperature of the surrounding atmosphere that ordinary lubrication will not, and even elaborate lubrication may not, bring about accurate timing performance of the motor.

In accordance with the present invention, provisions are made automatically to regulate the output torque of the coupling spring 104 so that the present motor will for the longest time accurately perform its designated timing function at a temperature of the surrounding atmosphere within any desired, and even the widest, range, and with, or even without any, lubrication of its parts and of the parts or devices driven thereby. To this end, the present motor 10 has its coupling spring 104 formed throughout as a bimetallic device having suitably joined dissimilar metal layers or elements 190 and 192 (Fig. 6). In order that the present bimetallic coupling spring 104 of exemplary spirally coiled type will respond to variations of the temperature of the surrounding atmosphere for correct regulation of its output torque, or more precisely, for correct regulation of the range of its output torque, or of its mean output torque, during running of the motor, the outer metal layer 190 thereof has a greater coefficient of linear expansion than the associated inner metal layer 192. Thus, considering the coupling spring 104 in Figs. 3 and 6, and assuming for the moment that this coupling spring is not prewound and that its outer end is free to move, it follows that on lowering temperature of the surrounding atmosphere the outer metal layer 190 will linearly contract more than the inner metal layer 192, so that the outer spring end would recede clockwise from the angular position in Fig. 3 relative to the inner spring end. Conversely, on rising temperature of the surrounding atmosphere, the outer metal layer 190 will linearly expand more than the inner metal layer 192, so that the outer spring end would creep counterclockwise from the angular position in Fig. 3 relative to the inner spring end.

The objective of the desired regulation of the output torque of the coupling spring 104 is, of course, maintenance of the impulse force for the escapement 144 as constant as possible, and in any event sufficiently constant to prevent any change in the rate of the escapement, despite such increases and decreases in the running friction of the moving parts of the motor and of any other parts or devices driven from the rotary commutation unit thereof, as are caused by downward and upward changes, respectively, in the temperature of the surrounding atmosphere. Hence, the increase and decrease of the mean output torque of the coupling spring in response to varying temperatures of the surrounding atmosphere should as nearly as possible be proportional to the increase and decrease in the running friction of the moving parts of the motor and of the other parts or devices driven from the rotary commutation unit thereof as caused by the same varying temperatures of the surrounding atmosphere. This may readily be achieved by appropriate design and calibration for differential linear expansion of the coupling spring and by initial prewinding of the same to an appropriate extent. If thus calibrated even approximately and initially prewound for correct impulsing of the escapement, the coupling spring will in its torque output sufficiently compensate for varying running friction of the moving parts of the motor and of the other parts or devices driven thereby as caused by variations in the temperature of the surrounding atmosphere over any desired, and even the widest, temperature range, so that the impulse force for the escapement will at all times remain sufficiently constant to hold the rate of the escapement uniform regardless of any and all variations of the temperature of the surrounding atmosphere. Being prewound and anchored at both ends, the coupling spring will respond to variations in the temperature of the surrounding atmosphere, not by free angular relative creeping between its ends as it would if the spring were unwound and free to move with either end as aforementioned, but by becoming stiffer at lower atmospheric temperatures and more relaxed at higher atmospheric temperatures. While thus prevented from responding to varying temperatures of the surrounding atmosphere by free angular relative creeping of its ends, the coupling spring will respond by varying its prewind, and hence, its mean wind during operation of the motor, by the angle of free relative creep between its ends at these same varying atmospheric temperatures if the spring were not prewound and its ends were free to move.

In thus subjecting the coupling spring to the direct action of a bimetal device, compensation of its output torque under most any atmospheric temperature conditions and for the life of the motor, may be achieved to the end of holding the rate of the escapement constant under any load driven from the rotary commutation unit of the motor, regardless of whether this load is constituted solely by the escapement or merely includes the latter, and regardless of lubrication, or lack of lubrication, of the moving parts of the motor and of the parts or devices driven from the rotary commutation unit thereof. Also, the direct action of the bimetal device on the coupling spring has the further effect of regulating not only the mean output torque of the coupling spring while the motor is running, but also the starting torque of the same at each restart of the motor, in accordance with variations in the temperature of the surrounding atmosphere, so that the overall torque output range of the coupling spring, while shifting with varying atmospheric temperatures, will remain of the same extent or spread. This means that the escapement will under any and all atmospheric temperature conditions start and hold its rate if the same starts and holds its rate on initial running of the motor with its load on the rotary commutation unit thereof.

While in the described motor 10 the exemplary coupling spring 104 is of spirally coiled type, it is fully within the purview of the present invention to make this coupling spring of any other type. Also, while the described exemplary coupling spring 104 is throughout its extent formed as a bimetal device, the same may be formed as such in part only. Thus, Fig. 7 shows a modified coupling spring 104a of which only a part, in this instance its outermost convolution 194 or a part thereof, is formed as a bimetal device, while the remaining convolutions 196 are integral monometallic parts of the spring. This modified coupling spring may be used to good advantage in motors of this type for many practical applications, such as, for example, for applications in which the basic torque output requirements of the coupling spring would make it difficult, if not impossible, to achieve correct torque output regulation of the spring by forming the latter throughout as a bimetal device.

While the exemplary coupling springs 104 and 104a described so far are bimetallic either throughout or at least in part and, hence, regulate their output torque throughout the entire range of variations of the temperature of the surrounding atmosphere to which the motor may be subjected, it is also within the scope of the present invention to regulate the output torque of the coupling spring, not only by means of a bimetal device which forms no part of the coupling spring, but also within a part only of the entire range of variations of the surrounding atmospheric temperature to which the motor may be subjected. Thus, Figs. 8 and 9 show a motor 10b which may in all essential respects be like the described motor 10 of Figs. 1 to 4, except that the coupling spring 104b is monometallic throughout and there is provided a separate bimetallic member or arm 198. The bimetallic arm 198 is at 200 suitably mounted with one end in the spring anchor collet 106b, and has near its other end a depending finger 202 which in the non-bent condition of the arm is slightly spaced inwardly from one of the convolutions, presently the outermost, of the coupling spring 104b. In the present example, the bimetallic arm 198 is adapted to react with the coupling spring 104b in shortening its effective length when the temperature of the surrounding atmosphere drops to a predetermined low only, thereby to increase the output torque of the coupling spring when needed to keep the rate of the escapement constant at lower atmospheric temperatures. To this end, the joined bimetal layers 204 and 206 of the arm 198 have smaller and larger coefficients of linear expansion, respectively, so that the arm 198 will, on a drop of the surrounding atmospheric temperature to the aforementioned predetermined low value, bend into the dot-and-dash-line position shown in Fig. 8 in which its depending finger 202 is in engagement with the outermost convolution of the coupling spring and will thus shorten the latter for effective flexure by the length of the spring extending from the engaging finger 202 to its anchorage to the arm 110b of the bracket 112b. The present provision of the separate bimetallic arm 198 in conjunction with a monometallic coupling spring may be used advantageously for many motor applications in which the single-step torque output regulation of the coupling spring is sufficient to hold the rate of the escapement constant throughout the range of temperature variations of the surrounding atmosphere to which the motor may be subjected.

Fig. 8A shows an arrangement which is similar to that of Figs. 8 and 9, except that the bimetallic arm 198c normally shortens the effective length of the monometallic coupling spring 104c and releases the full length of the latter for flexure when the the temperature of the surrounding atmosphere reaches a predetermined high only. To this end, the arm 198c may in every respect be like the arm 198 of Fig. 8, even to the disposition of its metal layers 204c and 206c of smaller and larger coefficients of linear expansion, so that this arm will, on a rise of the surrounding atmospheric temperature to the aforementioned predetermined high value, bend into the dot-and-dash-line position shown in Fig. 8A in which its depending finger 202c has disengaged from the coupling spring and thus released the entire length of the latter for flexure. This arrangement is advantageous for motor applications in which the rate of the escapement is constant without torque output compensation of the coupling spring at the prevailing lower temperatures of the atmosphere to which the motor may be subjected, but in which the rate of the escapement will remain constant only with torque output compensation, reductionwise, of the coupling spring at the higher atmospheric temperatures to which the motor may be subjected.

Figs. 10, 11 and 12 show a motor 10d with another modified bimetal-type torque output compensation of the coupling spring. Thus, the present motor 10d employs a monometallic coupling spring 104d and a bimetallic spring 210, presently also of spirally coiled type, which on lowering of the surounding atmospheric temperature to a predetermined low comes into play and adds to the wind of the coupling spring in an increasing amount as the surrounding atmospheric temperature continues to drop below the aforementioned predetermined low. To this end, the inner spring anchor collet 106d is turnable on the rotor shaft 42d and provided with a shoulder 212 which under the force of the coupling spring 104d is normally backed against a shoulder or finger 214 on a fixed collar 216 on the rotor shaft 42d, so that the coupling spring will periodically be rewound by the stepping rotor via collar 216 and shoulders 214 and 212. The inner end of the bimetallic spring 210 is suitably anchored to a collar 218 which is freely turnable on the rotor shaft 42d, while the outer end of this spring is suitably anchored at 220 to an arm 222 which is firmly mounted on the rotor shaft. This bimetallic spring 210 is thus under no load within a higher part of the range of temperature variations of the surrounding atmosphere to which the motor may be subjected (Fig. 10), but will be loaded within the remaining, lower part of this range of temperature variations. To this end, the collet 106d is provided with another shoulder 224, and the collar 218 is provided with a shoulder 226 which is spaced from the shoulder 224 within the aforementioned higher part of the range of temperature variations of the surrounding atmosphere. However, as the temperature of the surrounding atmosphere drops toward and to the aforementioned lower part of the range of atmospheric temperature variations, the differential contraction of the joined dissimilar metal layers of the bimetallic spring 210 will cause the latter angularly to shift its inner end, and also the free collar 218 to which it is anchored, clockwise as viewed in Fig. 10, whereby the shoulder 226 on the free collar 218 will approach and finally engage the shoulder 224 on the collet 106d. On further drop of the temperature of the surounding atmosphere within the aforementioned lower part of the range of atmospheric temperature variations, the bimetallic spring 210 will increasingly be stressed or loaded and will through the shoulder 226 on its free collar 218 and engaging shoulder 224 on the collet 106d turn the latter clockwise as viewed in Fig. 12, i.e. in a direction to additionally wind the coupling spring 104d. As a result, the other shoulder 212 on the collet 106d is moved out of engagement with the finger or shoulder 214 on the fixed collar 216 (Fig. 12) and the clockwise torque of the rotor is now transmitted to the coupling spring 104d via the fixed arm 222 on the rotor shaft, bimetallic spring 210, free collar 218 and shoulders 226 and 224 on the latter and on the free anchor collet 106d of the coupling spring. Of course, the winding effect of the bimetallic spring 210 on the monometallic coupling spring 104d increases with increasing drop in the temperature of the surrounding atmosphere. Conversely, the winding effect of the bimetallic spring 210 on the coupling spring 104d decreases with rising temperature of the surrounding temperature, and ceases altogether when the temperature of the surrounding atmosphere returns to the aforementioned higher part of the range of atmospheric temperature variations to which the motor may be exposed.

Fig. 10A shows part of a further modified motor 10e which may in all respects be like the motor 10d of Figs. 10 to 12, except that the bimetallic spring 210e is with its inner end anchored at 226 directly to the collet 106e to which the inner end of the monometallic coupling spring 104e is also anchored. In so doing, the bimetallic spring 210e will on an appropriate drop of the atmosphere of the surrounding temperature become sufficiently stressed to overcome the force of the coupling spring 104e and additionally wind the latter for greater torque output. Conversely, the bimetallic spring 210e will, on rising atmospheric temperature, relax more and more and at the proper dividing atmospheric temperature restore the drive of the coupling spring 104e via pin 214e on the fixed collar 216e on the rotor shaft 42e and shoulder 212e on the collet 106e.

Reference is now had to Fig. 10B which shows the inner end of the coupling spring 104' anchored to the outer end of a bimetallic arm 227 the inner end of which is in turn carried by the fixed collet 106' on the rotor shaft 42'. The bimetallic arm 227 will on rising and lowering temperatures of the surrounding atmosphere act to decrease and increase the wind of the coupling spring 104' as needed to compensate for the varying running friction of the moving parts of the motor and of the parts or devices driven from the rotary commutation unit thereof as caused by these atmospheric temperature variations.

While in the several forms of the motor described so far the bimetal device reacts directly with the coupling spring in regulating its torque output in accordance with variations in the temperature of the surrounding atmosphere, Figs. 13 and 14 show a motor 10f in which a bimetal device 230 reacts with the commutation device 16f and thus indirectly influences the force of the monometallic coupling spring 104f for its temperature-regulated torque output. To this end, the bimetal device 230 is arranged to react with the normally fixed unit of the commutation device to shift the same relative to the rotary unit thereof so as to cause advance and retardation of the commutation of the motor on lowering and rising temperatures of the surrounding atmosphere, respectively.

For its shiftability in this fashion, the normally fixed commutation unit, presently the brushes 52f on the insulating plate 64f, is mounted for rotation about the axis of the rotary commutation unit, presently the commutator 54f. Thus, the brush-carrying insulating plate 64f may be journalled on a bushing 232 in the plate 68f in which the commutator shaft 100f is journalled (Fig. 15). The bimetal device 230 is presently in the form of a bimetallic arm or strip which at one end is suitably anchored at 234 in a depending post 236 on the plate 68f, and carries at its other end a roller 238 that is received with a sliding fit in a slot 240 in the insulating plate 64f. Accordingly, the bimetallic arm 230 will shift the brush unit relative to the commutator 54f in either direction from the position shown in Fig. 13, depending on whether the temperature of the surrounding atmosphere rises above or drops below a certain mean temperature at which the bimetallic arm 230 assumes the straight disposition shown in Fig. 13. Assuming that the joined metal layers 242 and 244 of the bimetallic arm 230 have smaller and larger coefficients of linear expansion, respectively, it follows that the bimetallic arm will, on an appropriate atmospheric temperature drop below the aforementioned mean temperature, bend in the fashion shown in Fig. 14 and thereby shift the brush unit clockwise from the position shown in Fig. 13 to that shown in Fig. 14 and, accordingly, advance the commutation of the motor. Conversely, as the temperature of the surrounding atmosphere rises above the aforementioned mean temperature, the bimetallic arm 230 will from the position shown in Fig. 13 bend in a fashion opposite to that shown in Fig. 14 and thereby shift the brush unit counterclockwise from the position in Fig. 13 and, accordingly, retard the commutation of the motor. Of course, the bimetallic arm 230 will assume any bent disposition between its opposite extreme bends, depending on the temperature of the surrounding atmosphere, and the brush unit will assume in each case a corresponding angular position.

Assuming now that the temperature of the surrounding atmosphere is at the aforementioned mean value at which the bimetallic arm 230 is in its straight disposition as shown in Fig. 13, and further assuming that the momentary commutation of the motor is the same as that described for the previously described motor 10 in the momentary commutator position shown in Fig. 2, it follows that the rotor of the present motor will shortly step with the changing magnetic field as soon as the conductive segment 246 of the commutator 54f will on slight further counterclockwise rotation of the latter beyond the position in Fig. 13 engage the brush 52f'. Hence, the coupling spring 104f in Fig. 13 has almost reached the end of its periodic unwinding cycle and will soon be rewound to its maximum operational wind. Assuming now that the temperature of the surrounding atmosphere has dropped to the extent of causing bending of the bimetallic arm 230 and ensuing clockwise angular shift of the brush unit into the position shown in Fig. 14, it becomes evident from a comparison between Figs. 13 and 14 that in the same angular position of the commutator 54f the brush 52f' in Fig. 14 has already been engaged by the commutator segment 246 and the coupling spring 104f has already been rewound to its maximum operational wind. Since the operational rewind of the coupling spring 104f has now been advanced with respect to the escape of the commutator 54f, it stands to reason that the maximum operational wind of the coupling spring is now greater than it was before under the conditions shown in Fig. 13. Also, since the periodic rewind of the coupling spring 104f is uniform and equal to the stepping of the rotor, it further follows that the periodic rewind range of the coupling spring, while remaining of the same extent or spread, has been shifted to a higher level at which the mean operational wind of the coupling spring is greater than before. Accordingly, the output torque of the coupling spring is now sufficiently greater to compensate for the added running friction of the moving parts of the motor and of the parts or devices driven from the normally rotary commutation unit thereof as caused by the aforementioned drop in the temperature of the surrounding atmosphere, so that the escapement will continue at the same rate, as will be readily understood. The bimetallic arm 230 will thus respond to all temperature variations of the surrounding atmosphere to regulate the torque output of the coupling spring as needed to keep the rate of the escapement constant at any atmospheric temperature. Inherent in this arrangement is the fact that the prewind of the coupling spring is not affected by the regulation of its output torque, but this is of no consequence for most motor applications.

While the exemplary coupling of the bimetallic arm 230 with the brush unit of the motor 10f of Figs. 13 and 14 causes regulation of the torque output of the coupling spring with each change in the temperature of the surrounding atmosphere, it is also fully within the scope of the present invention to provide for a lost-motion coupling between the bimetallic arm and brush unit which causes regulation of the output torque of the coupling spring only when the temperature of the surrounding atmosphere reaches a predetermined low or a predetermined high, or both. Thus, Fig. 17 shows a motor 10g in which the output torque of the coupling spring is regulated only when the temperature of the surrounding atmosphere drops to a predetermined low. To this end, the turnable brush-carrying insulating plate 64g is normally yieldingly held in the angular home position shown by any suitable means, presently by cooperating permanent-magnet and non-permanent magnetic discs 250 and 252, for example, in the insulating brush-carrying plate 64g and plate 68g. Now, as the temperature of the surrounding atmosphere drops more and more, the bimetallic arm 230g will first bend toward and finally engage the shoulder 254 on the insulating plate 64g and thereafter shift the latter in clockwise direction to advance the commutation of the motor and thereby increase the output torque of the coupling spring. As the temperature of the surrounding atmosphere rises, the bimetallic arm 230g will unbend in the reverse direction, and the brush-carrying plate 64g will follow in counterclockwise direction to retard the commutation of the motor, the plate 64g being thus compelled to follow the bimetallic arm by the attractive force of the disaligned magnetic discs 250 and 252, as will be readily understood. Return shifting of the brush-carrying plate 64g will on rising atmospheric temperature take place until the same reaches its home position in which the magnetic discs 250 and 252 are aligned and, hence, in optimum attracting relation with each other. Of course, the instant brush-carrying plate 64g may also be made to respond to atmospheric temperatures above a predetermined high for appropriately retarding the commutation of the motor, simply by providing the brush-carrying plate with another shoulder 256 (shown in dotted lines in Fig. 17).

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a motor, the combination with a field structure, a rotor structure, coils carried by one of said structures, a commutation device having rotary and fixed units and being operative on current flow therethrough sequentially to energize said coils to produce in said one structure a turning magnetic field which drives said rotor structure in phase therewith, spring means interposed and forming the sole driving connection between said rotor structure and rotary unit, said rotor structure, rotary unit and spring means constituting a rotary system, and means providing for relative rotation between said rotary unit and rotor structure through a limited range within part of which the latter may turn with the magnetic field, and to one end of which said spring means will, on deenergization of said coils, urge said rotary unit and rotor structure so as to prevent unloading of said spring means below a certain preload and to hold said rotor structure in position to step into phase relation with the magnetic field on reenergization of said coils, of bimetallic means carried by said system and operatively associated with said spring means to vary the force of the latter on certain variation of the temperature of the surrounding atmosphere.

2. The combination in a motor as set forth in claim 1, in which part of said spring means is formed as said bimetallic means.

3. The combination in a motor as set forth in claim 1, in which said entire spring means is formed as said bimetallic means.

4. The combination in a motor as set forth in claim 1, in which said bimetallic means has with said spring means a connection providing lost motion which on lowering of the temperature of the surrounding atmosphere below a certain value is taken up by said bimetallic means to decrease the effective length of said spring means.

5. The combination in a motor as set forth in claim 1, in which said bimetallic means normally engages said spring means to decrease the effective length of the latter, and disengages from said spring means on rising temperature of the surrounding atmosphere above a certain value to render the entire length of said spring means effective.

6. The combination in a motor as set forth in claim 1, in which said rotor structure and rotary unit constitute elements of said rotary system, and said bimetallic means is a part of one of said elements and drivingly connects said spring means with said one element so as to change the flexure of said spring means on said temperature variation of the surrounding atmosphere.

7. The combination in a motor as set forth in claim 1, in which said motor structure has a shoulder and carries a turnable element with which said spring means is connected and which is normally angularly backed against said shoulder by the force of said spring means for rotor torque transmission to the latter via said shoulder, and said bimetallic means operatively connects said rotor structure and element so as to turn the latter from backing engagement with said shoulder on lowering of the temperature of the surrounding atmosphere below a certain value and thereby increase the force of said spring means and also transmit the rotor torque to the latter via said bimetallic means.

8. In a motor, the combination with a field structure, a rotor structure, coils carried by one of said structures, a commutation device having rotary and fixed units and being operative on current flow therethrough sequentially to energize said coils to produce in said one structure a rotary magnetic field which drives said rotor structure in phase therewith, a spirally coiled coupling spring interposed and forming the sole driving connection between said rotor structure and rotary unit, said rotor structure, rotary unit and spring constituting a rotary system, and means providing for relative rotation between said rotary unit and rotor structure through a limited range within part of which the latter may turn with the magnetic field and to one end of which said spring will, on deenergization of said coils, urge said rotary unit and rotor structure so as to prevent unwinding of said spring below a certain prewind thereof and to hold said rotor structure in position to step into phase relation with the magnetic field on reenergization of said coils, of a bimetal device carried by said system and operatively associated with said spring to vary the force of the latter on certain variation of the temperature of the surrounding atmosphere.

9. The combination in a motor as set forth in claim 8, in which said spring and bimetal device are one and the same and formed by joined dissimilar metal layers arranged in spirally coiled fashion.

10. The combination in a motor as set forth in claim 8, in which said rotor structure and rotary unit constitute elements of said rotary system, and said bimetal device is an arm carried with one end by one of said elements and being bent on lowering of the temperature of the surrounding atmosphere below a certain value so as to engage with its other end said spring to decrease the effective length of the latter.

11. The combination in a motor as set forth in claim 8, in which said rotor structure and rotary unit constitute elements of said rotary system, and said bimetal device is an arm which forms part of and is carried with one end by one of said elements, and to the other end of which the adjacent end of said spring is anchored, so that said arm will vary the prewind of said spring on said temperature variation of the surrounding atmosphere, 12. The combination in a motor as set forth in claim 8, in which said rotor structure has a shoulder and carries a turnable element with which one end of said spring is connected and which is normally angularly backed against said shoulder by the force of said spring for rotor torque transmission to the latter via said shoulder, and said bimetal device operatively connects said rotor structure and element so as to turn the latter from backing engagement with said shoulder on lowering of the temperature of the surrounding atmosphere below a certain value and thereby increase the prewind of said spring and also transmit the rotor torque to the latter via said bimetal device.

13. The combination in a motor as set forth in claim 8, in which said rotor structure has a shoulder and carries a turnable element with which one end of said spring is connected and which is normally angularly backed against said shoulder by the force of said spring for rotor torque transmission to the latter via said shoulder, and said bimetal device is a bimetallic spirally coiled spring connecting said rotor structure and element and operative to turn the latter from backing engagement with said shoulder on lowering of the temperature of the surrounding atmosphere below a certain value and thereby increase the prewind of said coupling spring and also transmit the rotor torque to the latter via said bimetallic spring.

14. The combination in a motor as set forth in claim 8, in which said rotor structure has a shoulder and carries a turnable element with which one end of said coupling spring is connected and which is normally angularly backed against said shoulder by the force of said coupling spring for rotor torque transmission to the latter via said shoulder, said rotor structure and element constituting members of a rotor assembly, and said bimetal device is a bimetallic spirally coiled spring anchored with one end to one of said members and having with the other member a connection providing lost motion which is taken up by said bimetallic spring at a certain low temperature of the surrounding atmosphere, so that on lowering of the surrounding atmospheric temperature below said certain low temperature said bimetallic spring will turn said element from backing engagement with said shoulder and thereby increase the prewind of said coupling spring and also transmit the rotor torque to the latter via said bimetallic spring.

15. In a motor, the combination with a field structure, a rotor structure and coils carried by one of said structures, of a commutation device operative on current flow therethrough sequentially to energize said coils to produce in said one structure a turning magnetic field which drives said rotor structure in phase therewith, said device including two units each being rotary relative to the other of which a first unit is a commutator with conductive segments and the second unit is a set of brushes; spring means interposed and forming the sole driving connection between said rotor structure and one of said units; means providing for relative rotation between said one unit and rotor structure through a limited range within part of which the latter may turn with the magnetic field, and to one end of which said spring means will, on deenergization of said coils, urge said one unit and rotor structure so as to prevent unloading of said spring means below a certain preload and to hold said rotor structure in position to step into phase relation with the magnetic field on reenergization of said coils; and means, including a bimetallic member, operative on certain variation of the temperature of the surrounding atmosphere angularly to shift the other of said units relative to said one unit.

16. The combination in a motor as set forth in claim 15, which further comprises an escapement drivingly connected with said one unit so as to be impulsed by the force of said spring means.

17. In a motor, the combination with a field structure, a rotor structure and coils carried by one of said structures, of a commutation device operative on current flow therethrough sequentially to energize said coils to produce in said one structure a turning magnetic field which drives said rotor structure in phase therewith, said device including two units each being rotary relative to the other of which a first unit is a commutator with conductive segments and the second unit is a set of brushes; spring means interposed and forming the sole driving connection between said rotor structure and one of said units; means providing for relative rotation between said one unit and rotor structure through a limited range within part of which the latter may turn with the magnetic field, and to one end of which said spring means will, on deenergization of said coils, urge said one unit and rotor structure so as to prevent unloading of said spring means below a certain preload and to hold said rotor structure in position to step into phase relation with the magnetic field on reenergization of said coils; a fixed support; and a bimetal member anchored with one end to said support and operatively connected at its other end with the other of said units so as normally to hold said other unit against turning motion relative to said support and on certain variation of the temperature of the surrounding atmosphere angularly to shift said other unit relative to said one unit.

18. In a motor, the combination with a field structure, a rotor structure and coils carried by one of said structures, of a commutation device operative on current flow therethrough sequentially to energize said coils to produce in said one structure a turning magnetic field which drives said rotor structure in phase therewith, said device including two units each being rotary relative to the other of which a first unit is a commutator with conductive segments and the second unit is a set of brushes; spring means interposed and forming the sole driving connection between said rotor structure and one of said units; means providing for relative rotation between said one unit and rotor structure through a limited range within part of which the latter may turn with the magnetic field, and to one end of which said spring means will, on deenergization of said coils, urge said one unit and rotor structure so as to prevent unloading of said spring means below a certain preload and to hold said rotor structure in position to step into phase relation with the magnetic field on reenergization of said coils; a fixed support; means yieldingly holding the other of said units in a certain angular position, and a bimetal element anchored with one end to said support and having at its other end with said other unit a connection providing lost motion which at a certain temperature of the surrounding atmosphere is taken up by said element so that on certain change of the surrounding atmospheric temperature from said certain temperature said other unit will be shifted from said certain position by said element.

No references cited.